United States Patent (10) Patent No.: US 10,730,014 B2
Oda et al. (45) Date of Patent: Aug. 4, 2020

(54) BOILER

(71) Applicant: MITSUBISHI HITACHI POWER SYSTEMS, LTD., Yokohama-shi, Kanagawa (JP)

(72) Inventors: Manabu Oda, Tokyo (JP); Hiroshi Kako, Kanagawa (JP); Hideo Miyanishi, Kanagawa (JP); Tomoaki Isobe, Kanagawa (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 15/741,814

(22) PCT Filed: Jul. 27, 2016

(86) PCT No.: PCT/JP2016/072077
§ 371 (c)(1),
(2) Date: Jan. 4, 2018

(87) PCT Pub. No.: WO2017/047242
PCT Pub. Date: Mar. 23, 2017

(65) Prior Publication Data
US 2018/0193796 A1 Jul. 12, 2018

(30) Foreign Application Priority Data

Sep. 14, 2015 (JP) .................................. 2015-180596

(51) Int. Cl.
*F16K 3/00* (2006.01)
*B01D 53/90* (2006.01)
(Continued)

(52) U.S. Cl.
CPC ......... *B01D 53/90* (2013.01); *B01D 53/8631* (2013.01); *F23C 7/008* (2013.01);
(Continued)

(58) Field of Classification Search
CPC ........................................................ F16K 3/00
See application file for complete search history.

(56) References Cited

U.S. PATENT DOCUMENTS 154,039 A * 8/1874 Hager ..................... F23L 13/02
126/292
1,506,386 A * 8/1924 Schauman .............. F23L 13/06
126/285 A
(Continued)

FOREIGN PATENT DOCUMENTS

CA 1071042 A 2/1980
CN 102251094 A 11/2011
(Continued)

OTHER PUBLICATIONS

Written Opinion dated Sep. 27, 2016, issued in counterpart Application No. PCT/JP2016/072077, with English Translation. (16 pages).
(Continued)

*Primary Examiner* — Gregory A Wilson
(74) *Attorney, Agent, or Firm* — Westerman, Hattori, Daniels & Adrian, LLP

(57) ABSTRACT

This boiler has a flue in which a reducing agent supplying device and a selective reduction catalyst are provided, a bypass flow path bypassing economizers is provided, and a first closing device partially closing the bypass flow path and a second closing device partially closing the flue are also provided. A plurality of first closing members, serving as the first closing device, are provided along the direction in which exhaust gas flows through the flue at a predetermined spacing in the width direction of the flue. A plurality of second closing members, serving as the second closing device are provided along the vertical direction at a predetermined spacing in the width direction of the flue. The first
(Continued)

closing members and the second closing members are arranged so as to be displaced from each other in the width direction of the flue.

7 Claims, 5 Drawing Sheets

(51) Int. Cl.

| | | |
|---|---|---|
| *F23J 15/00* | (2006.01) | |
| *B01D 53/86* | (2006.01) | |
| *F23C 7/00* | (2006.01) | |
| *F23J 15/08* | (2006.01) | |
| *F22D 1/36* | (2006.01) | |

(52) U.S. Cl.
CPC ............. *F23J 15/00* (2013.01); *F23J 15/003* (2013.01); *F23J 15/08* (2013.01); *B01D 2251/20* (2013.01); *B01D 2258/0283* (2013.01); *F22D 1/36* (2013.01); *F23J 2215/10* (2013.01); *F23J 2215/20* (2013.01)

(56) References Cited

U.S. PATENT DOCUMENTS

| | | | | |
|---|---|---|---|---|
| 3,320,906 A | * | 5/1967 | Domahidy | B01D 47/00 110/119 |
| 4,259,987 A | * | 4/1981 | Janssen | F24F 13/14 137/601.09 |
| 4,263,890 A | * | 4/1981 | Turko | F23L 13/06 110/147 |
| 5,165,903 A | * | 11/1992 | Hunt | B01D 53/60 423/239.1 |
| 5,423,272 A | * | 6/1995 | Dunn, Jr. | F22B 37/008 110/264 |
| 5,943,865 A | * | 8/1999 | Cohen | B01D 53/8631 110/345 |
| 8,511,258 B2 | | 8/2013 | Yamamoto et al. | |
| 8,784,740 B2 | * | 7/2014 | Wada | B01D 53/8631 137/897 |
| 2011/0135541 A1 | | 6/2011 | Sakata et al. | |
| 2011/0150716 A1 | | 6/2011 | Wada et al. | |
| 2012/0189521 A1 | | 7/2012 | Shijo et al. | |
| 2013/0291983 A1 | | 11/2013 | Cohen et al. | |
| 2014/0051345 A1 | * | 2/2014 | Bauer | F24F 3/0522 454/267 |

FOREIGN PATENT DOCUMENTS

| | | | |
|---|---|---|---|
| CN | 103486563 B | | 4/2015 |
| EP | 1 990 574 A2 | | 11/2008 |
| EP | 3045220 A1 | | 7/2016 |
| JP | 64-46628 U | | 3/1989 |
| JP | 1-81447 U | | 5/1989 |
| JP | 1-129549 U | | 9/1989 |
| JP | 2-92434 U | | 7/1990 |
| JP | 6-11132 A | | 1/1994 |
| JP | 08-215553 A | | 8/1996 |
| JP | 8-303716 A | | 11/1996 |
| JP | 09089211 A | * | 4/1997 |
| JP | 11-114393 A | | 4/1999 |
| JP | 2013-234838 A | | 11/2013 |
| JP | 5748894 B1 | | 7/2015 |
| WO | 2010-018769 A1 | | 2/2010 |
| WO | 2010/023852 A1 | | 3/2010 |
| WO | 2011/016585 A1 | | 2/2011 |

OTHER PUBLICATIONS

English translation of International Search Report dated Sep. 27, 2016, issued in counterpart International Application No. PCT/JP2016/072077 (2 pages).

Extended Search Report dated Jan. 3, 2019, issued in counterpart European Application No. 16846115.0 (9 pages).

* cited by examiner

BOILER

TECHNICAL FIELD

The present invention relates to a boiler for producing steam which is used for power generation, factory use, or the like.

BACKGROUND ART

A coal-fired boiler of the related art has a furnace having a hollow shape and installed in a vertical direction, and a plurality of combustion burners are disposed along a circumferential direction on the wall of the furnace. Further, in the coal-fired boiler, a flue is connected to an upper portion of the furnace, and a heat exchanger for producing steam is disposed in the flue. For this reason, the combustion burner injects a mixture of fuel and air into the furnace, whereby a flame is formed, and a combustion gas is generated and flows to the flue. Then, steam is produced by heating water flowing through the heat exchanger with flue gas generated by combustion. Further, an exhaust duct is connected to the flue, a denitration facility, an electric dust collector, a desulfurizer, and the like are provided in the exhaust duct, and a chimney is provided at a downstream end portion of the flue.

In such a coal-fired boiler, in the denitration facility disposed in the exhaust duct, a reducing agent such as ammonia is supplied to the flue, and the flue gas supplied with the reducing agent is caused to pass through a catalyst which promotes the reaction between nitrogen oxides and the reducing agent, whereby the nitrogen oxides in the flue gas are removed. In this case, in order to efficiently remove the nitrogen oxides in the flue gas with the catalyst, it is necessary to maintain the temperature of the flue gas at a temperature higher than or equal to a predetermined reaction temperature. For this reason, the coal-fired boiler is provided with a bypass flow path bypassing the heat exchanger (an economizer), and during low load operation, high-temperature flue gas is bypassed to the upstream side of a denitration catalyst by the bypass flow path, whereby the temperature of the flue gas is maintained at a temperature higher than or equal to the reaction temperature.

If the high-temperature flue gas is bypassed during the low load operation of the coal-fired boiler, the high-temperature flue gas is mixed with low-temperature flue gas flowing through the flue. However, since the temperature difference between the low-temperature flue gas and the high-temperature flue gas is large, the low-temperature flue gas and the high-temperature flue gas are not sufficiently mixed with each other here, and acidic ammonium sulfate is precipitated in the low-temperature flue gas, so that there is a concern that the denitration catalyst may be blocked.

In order to solve such a problem, a technique to provide a mixer at a joining portion between the flue and the bypass flow path has been proposed, and for example, there are gas mixing devices described in patent literatures described below. In the gas mixing device described in PTL 1, an inflow part causing another gas flow into a duct through which a gas flows is provided, a plurality of blowing flow paths are connected to the inflow part, and a blowing port of each of the blowing flow paths is disposed such that gas is blown along a gas flow in the duct. Further, in the gas mixing device described in PTL 2, a plurality of box members are disposed in a first duct, and a second duct is connected to the first duct so as to communicate with a divided inlet opening of each of the box members.

CITATION LIST

Patent Literature

[PTL 1] Japanese Unexamined Patent Application Publication No. 08-215553

[PTL 2] Japanese Unexamined Patent Application Publication No. 11-114393

SUMMARY OF INVENTION

Technical Problem

In each of the patent literatures described above, since a plurality of box-shaped members each having a flow path shape are disposed in the flue, a structure becomes complicated and the manufacturing cost increases. Further, the box-shaped member serves as large resistance with respect to a fluid flowing through the flue, and thus the low-temperature flue gas and the high-temperature flue gas are not sufficiently mixed with each other, so that there is a concern that a laminar flow may be formed.

The present invention is to solve the above-mentioned problem and has an object to provide a boiler in which simplification of a structure and a reduction in cost are attained and low-temperature flue gas and high-temperature flue gas are properly mixed with each other.

Solution to Problem

A boiler according to the present invention for achieving the above object includes: a furnace having a hollow shape and installed along a vertical direction; a combustion device disposed in the furnace; a flue connected to an upper portion of the furnace in the vertical direction to cause flue gas to flow therethrough; a heat exchanger disposed in the flue; a reducing agent supplying device disposed on the further downstream side in a flow direction of the flue gas with respect to the heat exchanger in the flue; a denitration catalyst disposed on the further downstream side in the flow direction of the flue gas with respect to the reducing agent supplying device in the flue; a bypass flow path having one end portion connected to the further upstream side in the flow direction of the flue gas with respect to the heat exchanger in the flue, and the other end portion connected between the heat exchanger and the reducing agent supplying device in the flue; a first closing device which is provided on the further upstream side in the flow direction of the flue gas with respect to a downstream side connection portion with the flue, to which the other end portion of the bypass flow path is connected, and partially closes the bypass flow path; and a second closing device which is provided on the further upstream side with respect to the downstream side connection portion in the flue and partially closes the flue, in which the first closing device has a plurality of first closing members extending along the flow direction of the flue gas in the flue and provided at predetermined intervals in a width direction of the flue, the second closing device has a plurality of second closing members extending along a vertical direction and provided at predetermined intervals in the width direction of the flue, and the plurality of first closing members and the plurality of second closing members are disposed to be shifted with respect to each other in the width direction of the flue.

Therefore, during high load operation, the flue gas generated in the furnace flows to the flue, whereby exhaust heat is recovered by the heat exchanger, and thereafter, the reducing agent is supplied from the reducing agent supplying device, and nitrogen oxides contained in the flue gas are removed by the denitration catalyst. Since the flue is partially closed by the second closing device, the flue gas flowing through the flue is rectified due to a pressure loss, so that a flow velocity distribution thereof is uniformized. On the other hand, during low load operation, the flue gas generated in the furnace flows to the flue, whereby exhaust heat is recovered by the heat exchanger, and some of the flue gas bypass the heat exchanger by the bypass flow path and return to the flue, thereby joining the flue gas in the flue, and thereafter, the reducing agent is supplied from the reducing agent supplying device, so that nitrogen oxides contained in the flue gas are removed by the denitration catalyst. The bypass flow path is partially closed by the first closing device, and therefore, the flow velocity of the flue gas flowing from the bypass flow path to the flue increases, whereby a penetrating force of the flue gas is maintained, and the temperature distribution in the vertical direction is uniformized. At this time, the plurality of first closing members and the plurality of second closing members are disposed to be shifted with respect to each other in the width direction of the flue, and therefore, the low-temperature flue gas increased in flow velocity and rectified by the second closing device does not inhibit the penetrating force of the high-temperature flue gas flowing from the bypass flow path to the flue through the first closing device, and the low-temperature flue gas and the high-temperature flue gas are efficiently mixed with each other due to a turbulent flow. As a result, it is possible to attain simplification of a structure and a reduction in cost and to properly mix the low-temperature flue gas and the high-temperature flue gas.

In the boiler according to the present invention, the flue is provided with a straight flue section, and the second closing device and the reducing agent supplying device are disposed in the straight flue section.

Therefore, the second closing device and the reducing agent supplying device are disposed in the straight flue section, whereby the reducing agent is supplied to the flue gas with the flow velocity distribution uniformized by the second closing device, or the flue gas with the temperature distribution uniformized by the first and second closing devices, and thus the reducing agent is uniformly supplied with variation of the reducing agent with respect to the flue gas being reduced, so that the efficiency of removing the nitrogen oxides by the denitration catalyst can be improved.

In the boiler according to the present invention, a flux rate adjustment damper is disposed on the further upstream side with respect to the second closing device in the straight flue section.

Therefore, the second closing device is disposed between the flow rate adjustment damper and a downstream side connection portion of the bypass flow path, whereby the flue gas having the uniformized flow velocity distribution or temperature distribution is caused to flow to the reducing agent supplying device in that state, and thus the efficiency of removing the nitrogen oxides by the denitration catalyst can be improved.

In the boiler according to the present invention, a mixing space section is provided at a position facing the downstream side connection portion on the further downstream side with respect to the first closing device in the flue.

Therefore, the mixing space section is provided on the downstream side of the first closing device and the second closing device, whereby the high-temperature flue gas flowing from the bypass flow path to the flue through the first closing device and the low-temperature flue gas which has passed through the second closing device are efficiently mixed with each other in the mixing space section, and thus the temperature distribution of the flue gas can be easily uniformized with a simple configuration.

In the boiler according to the present invention, the first closing device and the second closing device are disposed to face the mixing space section.

Therefore, the high-temperature flue gas and the low-temperature flue gas are mixed with each other in the mixing space section in a state where the flow velocity is increased, and thus the temperature distribution of the flue gas can be easily uniformized.

In the boiler according to the present invention, the second closing member is a closing plate extending along a direction orthogonal to the flow direction of the flue gas in the flue and is set to have the same width along the vertical direction.

Therefore, the flue gas collides with the closing plate, whereby a vortex is generated when the flue gas goes round an end portion of the closing plate, and therefore, the high-temperature flue gas and the low-temperature flue gas can be efficiently mixed with each other due to the generated vortex.

In the boiler according to the present invention, a reinforcing plate extending to the downstream side in the flow direction of the flue gas is fixed to the closing plate.

Therefore, the closing plate is reinforced by the reinforcing plate, so that the rigidity thereof is improved, and therefore, durability can be improved.

ADVANTAGEOUS EFFECTS OF INVENTION

According to the boiler according to the present invention, the first closing device having a plurality of first closing members is provided in the bypass flow path, the second closing device having a plurality of second closing members is provided in the flue, and the first closing members and the second closing members are disposed to be shifted with respect to each other in the width direction of the flue. Therefore, it is possible to attain simplification of a structure and a reduction in cost and to properly mix the low-temperature flue gas and the high-temperature flue gas.

DESCRIPTION OF EMBODIMENTS

Hereinafter, a preferred embodiment of a boiler according to the present invention will be described in detail with reference to the accompanying drawings. The present invention is not limited by this embodiment, and in a case where there are a plurality of embodiments, the present invention also includes a configuration which is made by a combination of the respective embodiments.

Figure 1:
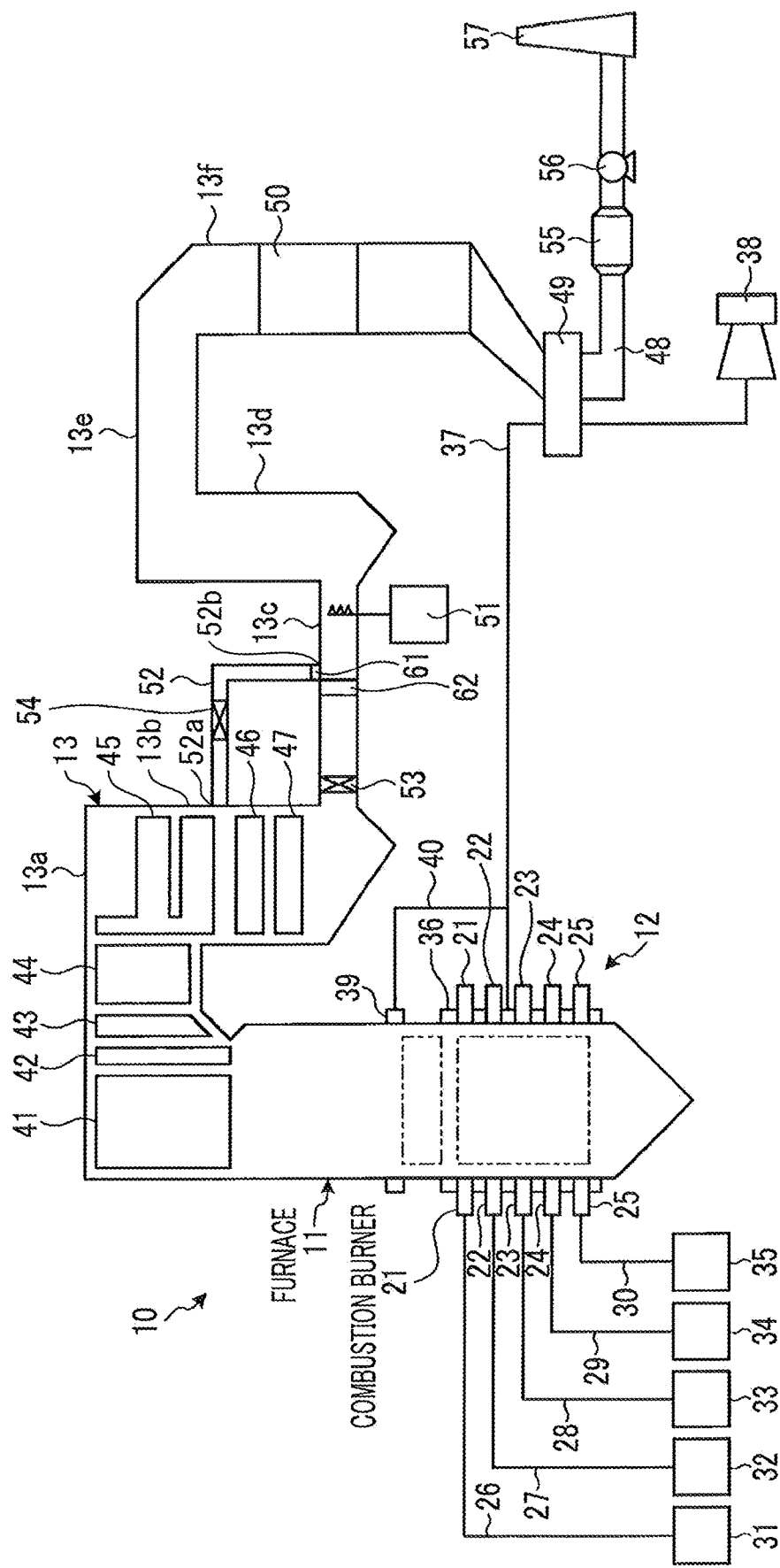
FIG. 1 is a schematic configuration diagram showing a coal-fired boiler of an embodiment.

FIG. 1 is a schematic configuration diagram showing a coal-fired boiler of this embodiment.

The boiler of this embodiment is a pulverized coal-fired boiler in which pulverized coal obtained by pulverizing coal is used as pulverized fuel (solid fuel), the pulverized coal is burned by a combustion burner, and it is possible to recover heat generated by the combustion.

In this embodiment, as shown in FIG. 1, a coal-fired boiler 10 is a conventional boiler and has a furnace 11, a combustion device 12, and a flue 13. The furnace 11 has a rectangular hollow shape and is installed along a vertical direction, and a furnace wall configuring the furnace 11 is configured of a heat transfer tube.

The combustion device 12 is provided in a lower portion of the furnace wall (heat transfer tube) configuring the furnace 11. The combustion device 12 has a plurality of combustion burners 21, 22, 23, 24, and 25 mounted on the furnace wall. In this embodiment, the combustion burners 21, 22, 23, 24, and 25 are disposed by five sets along a vertical direction, with four combustion burners disposed at equal intervals along a circumferential direction being as one set, that is, disposed at five stages along the vertical direction. However, the shape of the furnace, the number of combustion burners in one stage, and the number of stages are not limited to this embodiment.

The combustion burners 21, 22, 23, 24, and 25 are respectively connected to coal pulverizers (grinders or mills) 31, 32, 33, 34, and 35 through pulverized coal supply pipes 26, 27, 28, 29, and 30. Although not shown in the drawing, each of the coal pulverizers 31, 32, 33, 34, and 35 is configured to include a grinding table having a rotation axis along the vertical direction and supported to be rotationally driven in a housing, and a plurality of grinding rollers supported above the grinding table so as to be rotatable in conjunction with the rotation of the grinding table. Therefore, if coal is input between the plurality of grinding rollers and the grinding table, here, the coal is pulverized to a predetermined size, and the pulverized coal classified by conveying air (primary air) can be supplied from the pulverized coal supply pipes 26, 27, 28, 29, and 30 to the combustion burners 21, 22, 23, 24, and 25.

Further, the furnace 11 has a wind box 36 provided at the mounting position of each of the combustion burners 21, 22, 23, 24, and 25, one end portion of an air duct 37 is connected to the wind box 36, and a blower 38 is mounted on the other end portion of the air duct 37. Further, the furnace 11 has an additional air nozzle 39 provided above the mounting position of each of the combustion burners 21, 22, 23, 24, and 25, and an end portion of a branch air duct 40 branched from the air duct is connected to the additional air nozzle 39. Therefore, combustion air (fuel gas combustion air or secondary air) sent by the blower 38 can be supplied from the air duct 37 to the wind box 36 and from this wind box 36 to each of the combustion burners 21, 22, 23, 24, and 25, and the combustion air (additional air) sent by the blower 38 can be supplied from the branch air duct 40 to the additional air nozzle 39.

The flue 13 is connected to an upper portion of the furnace 11. The flue 13 is provided with superheaters 41, 42, and 43, reheaters 44 and 45, and economizers 46 and 47, as heat exchangers for recovering the heat of flue gas, and heat exchange is performed between the flue gas generated by combustion in the furnace 11 and water.

A gas duct 48 through which the flue gas subjected to the heat exchange is discharged is connected to the downstream side of the flue 13. An air heater 49 is provided between the gas duct 48 and the air duct 37 to perform heat exchange between air flowing through the air duct 37 and the flue gas flowing through the gas duct 48, and thus it is possible to raise the temperature of the combustion air which is supplied to the combustion burners 21, 22, 23, 24, and 25.

Further, the flue 13 has a selective reduction catalyst (a denitration catalyst) 50 provided at a position on the further upstream side with respect to the air heater 49. The selective reduction catalyst 50 is for removing and reducing nitrogen oxides in the flue gas by supplying a reducing agent having an action of reducing nitrogen oxides such as ammonia or urea water into the flue 13 and promoting the reaction of the nitrogen oxides with the reducing agent in the flue gas supplied with the reducing agent. For this reason, the flue 13 has a reducing agent supplying device 51 provided on the further upstream side with respect to the selective reduction catalyst 50. The reducing agent supplying device 51 supplies the reducing agent toward the downstream side with respect to the entire flow path in the flue 13, thereby being able to diffuse the reducing agent in the flow path through which the flue gas flows. As the reducing agent, ammonia water, gaseous ammonia, urea water, or the like can be used.

In the selective reduction catalyst 50, in order to efficiently remove the nitrogen oxides in the flue gas by the catalyst, it is necessary to maintain the temperature of the flue gas at a temperature higher than or equal to a predetermined reaction temperature. For this reason, the flue 13 is provided with a bypass flow path 52 bypassing the economizers 46 and 47 as some heat exchangers. One end portion of the bypass flow path 52 is connected between the reheater 45 and the economizer 46 in the flue 13, and the other end portion of the bypass flow path 52 is connected to the upstream side of the reducing agent supplying device 51 in the flue 13. Then, the flue 13 has a flow rate adjustment damper 53 provided on the downstream side of the economizer 47, and a flow rate adjustment damper 54 is provided in the bypass flow path 52.

During the low load operation of the coal-fired boiler 10, the degree of opening of the flow rate adjustment damper 53 is reduced and the flow rate adjustment damper 54 is opened, whereby some of the high-temperature flue gas flowing through the flue 13 are caused to flow through the bypass flow path 52, thereby bypassing the economizers 46 and 47. Then, the heat of the flue gas flowing through the flue 13 is recovered by the economizers 46 and 47, whereby the temperature of the flue gas is lowered. However, the high-temperature flue gas which has passed through the bypass flow path 52 is mixed with the flue gas having a lowered temperature, and therefore, it is possible to maintain the temperature of the flue gas at a temperature higher than or equal to the reaction temperature of the selective reduction catalyst 50.

The gas duct 48 which is connected to the flue 13 has an ash dust treatment device (an electric dust collector or a desulfurizer) 55 and an induction blower 56 provided at positions on the further downstream side with respect to the air heater 49, and a chimney 57 is provided at the downstream end portion of the gas duct 48.

For this reason, if the coal pulverizers 31, 32, 33, 34, and 35 are driven, the produced pulverized coal is supplied to the combustion burners 21, 22, 23, 24, and 25 through the pulverized coal supply pipes 26, 27, 28, 29, and 30 together with conveying air. Further, the heated combustion air is supplied from the air duct 37 to each of the combustion burners 21, 22, 23, 24, and 25 through the wind box 36. Then, the combustion burners 21, 22, 23, 24, and 25 blow a pulverized fuel-air mixture, in which the pulverized coal and the conveying air are mixed, into the furnace 11 and also blow the combustion air into the furnace 11, and at this time, ignition occurs, whereby a flame can be formed. In the furnace 11, the pulverized fuel-air mixture and the combustion air burn to generate a flame, and if a flame occurs in a lower portion of the furnace 11, combustion gas (flue gas) rises in the furnace 11 and is discharged to the flue 13.

The furnace 11 is set such that the supply amount of air is less than a theoretical amount of air with respect to the supply amount of pulverized coal, whereby the inside of the furnace 11 is maintained in a reducing atmosphere. Then, NOx generated due to the combustion of the pulverized coal is reduced in the furnace 11, and thereafter, additional air is additionally supplied from the additional air nozzle 39, whereby the oxidation combustion of the pulverized coal is completed, and the amount of NOx generated due to the combustion of the pulverized coal is reduced.

At this time, water supplied from a water feed pump (not shown) is preheated by the economizers 46 and 47, then supplied to a steam drum (not shown), and becomes saturated steam by being heated while being supplied to each water pipe (not shown) of the furnace wall, and the saturated steam is sent to a steam drum (not shown). Further, the saturated steam in the steam drum (not shown) is introduced into the superheaters 41, 42, and 43 and superheated by the combustion gas. The superheated steam generated in the superheaters 41, 42, and 43 is supplied to a power plant (for example, a turbine or the like) (not shown). Further, the steam extracted in the middle of an expansion process in the turbine is introduced into the reheaters 44 and 45 to be superheated again, and then returned to the turbine. Although the furnace 11 has been described as being a drum type (steam drum), it is not limited to this structure.

Thereafter, the flue gas which has passed through the economizers 46 and 47 of the flue 13 and the flue gas which has passed through the bypass flow path 52 and joined the flue gas of the flue 13 are supplied with the reducing agent from the reducing agent supplying device 51, and the reducing agent is diffused while flowing through the flue 13. Then, the nitrogen oxides in the flue gas of the flue 13 are reduced and removed by the selective reduction catalyst 50, particulate matter and a sulfur content are removed in the ash dust treatment device 55, and thereafter, the flue gas is discharged into the atmosphere from the chimney 57.

In the coal-fired boiler 10 configured in this manner, during the high load operation, the total amount of high-temperature flue gas flows through the flue 13. However, since a bent portion is present in the flue 13, the flow velocity differs between the inside and the outside of the bent portion, and if the reducing agent is supplied from the reducing agent supplying device 51 to the flue gas in such regions in which the flow velocities are different, variation occurs in the concentration of the reducing agent in the low velocity region and the high velocity region of the flue gas. Further, during the low load operation, if some of the high-temperature flue gas are bypassed by the bypass flow path 52, the high-temperature flue gas is introduced from the bypass flow path 52 into the low-temperature flue gas flowing through the flue 13. However, a flow rate difference or a temperature difference of the flue gas is large, and therefore, mixing becomes insufficient. Then, during the high load operation or the low load operation of the coal-fired boiler 10, the efficiency of reducing the nitrogen oxides by the selective reduction catalyst 50 decreases.

Figure 2:
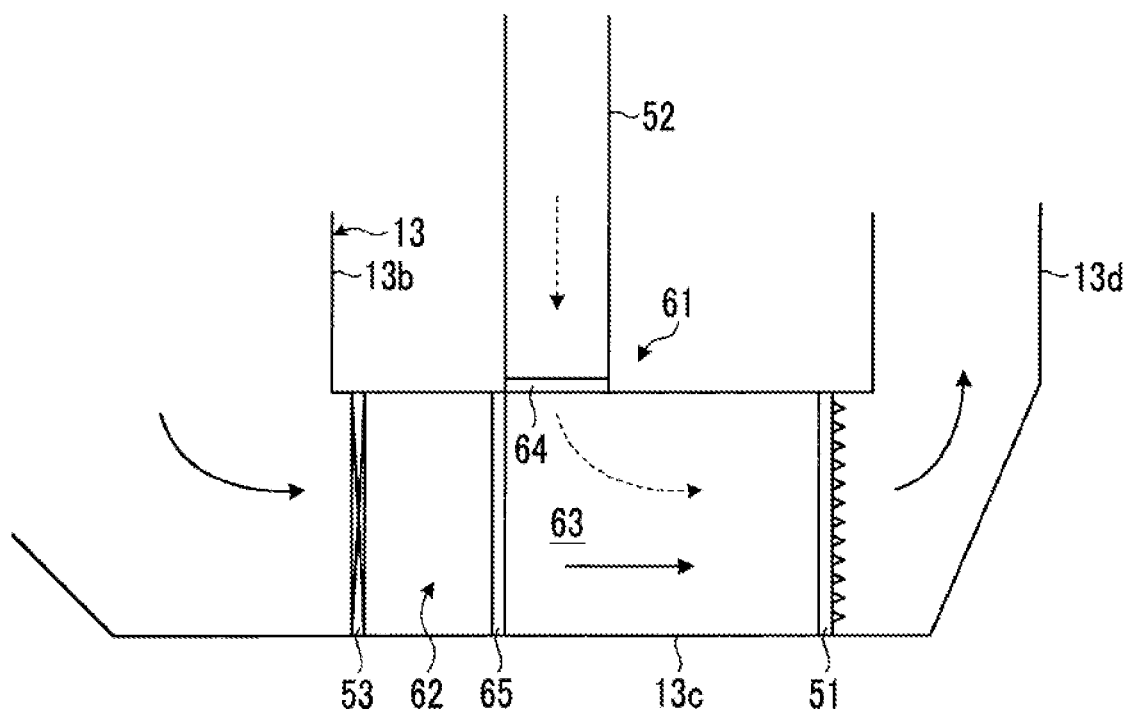
FIG. 2 is a side view showing a flue of the coal-fired boiler.
Figure 3:
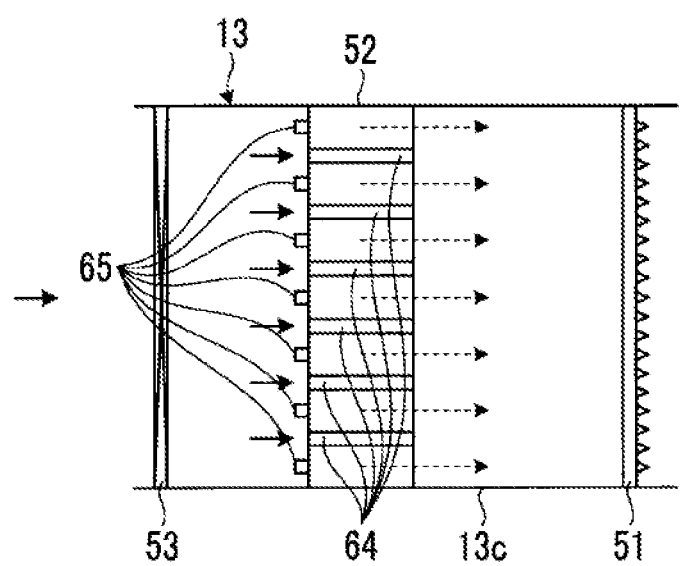
FIG. 3 is a plan view showing the flue of the coal-fired boiler.
Figure 4:
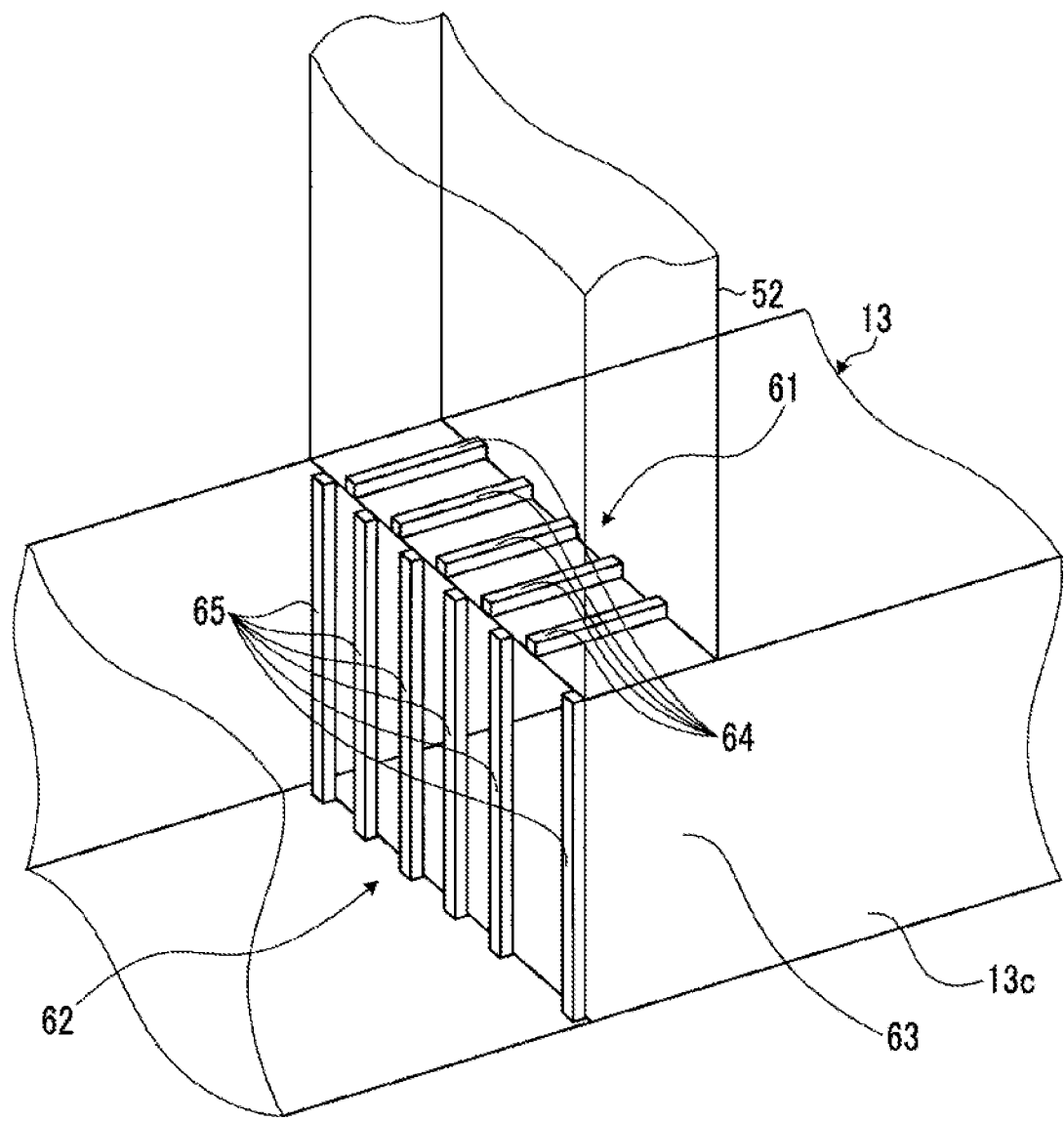
FIG. 4 is a perspective view showing the flue of the coal-fired boiler.

FIG. 2 is a side view showing the flue of the coal-fired boiler, FIG. 3 is a plan view showing the flue of the coal-fired boiler, and FIG. 4 is a perspective view showing the flue of the coal-fired boiler.

In this embodiment, a first closing device 61 for partially closing the bypass flow path is provided on the further upstream side with respect to a downstream side connection portion with the flue 13 in the bypass flow path 52, and a second closing device 62 for partially closing the flue is provided on the further upstream side with respect to the downstream side connection portion in the flue 13. Then, a mixing space section 63 for the flue gas is provided at a position facing the second closing device 62 on the further downstream side with respect to the first closing device 61 in the flue 13. Here, it is preferable that both the closing rates of the first closing device 61 and the second closing device 62 are 50% or less from the viewpoint of a pressure loss, abrasion, or the like.

That is, the flue 13 is configured by continuously providing a first horizontal flue section 13a, a first vertical flue section 13b, a second horizontal flue section (a straight flue section) 13c, a second vertical flue section 13d, a third horizontal flue section 13e, and a third vertical flue section 13f. Then, in the flue 13, the superheaters 41, 42, and 43, the reheaters 44 and 45, and the economizers 46 and 47 are disposed in the first horizontal flue section 13a and the first vertical flue section 13b. Further, in the flue 13, the flow rate adjustment damper 53 and the reducing agent supplying device 51 are disposed in the second horizontal flue section 13c, and the selective reduction catalyst 50 is disposed in the third vertical flue section 13f. The reducing agent supplying device 51 may be disposed in the second vertical flue section 13d.

In the bypass flow path 52, an upstream side connection portion 52a on one end side thereof is connected between the reheater 45 and the economizer 46 in the first vertical flue section 13b, and a downstream side connection portion 52b on the other end side is connected between the flow rate adjustment damper 53 and the reducing agent supplying device 51 of the second horizontal flue section 13c. Then, the first closing device 61 is disposed to face the mixing space section 63 of the flue 13 at the downstream side connection portion 52b in the bypass flow path 52, and the second closing device 62 is disposed to face the mixing space section 63 on the immediately upstream side of the mixing space section 63 in the second horizontal flue section 13c.

As shown in FIGS. 2 to 4, the first closing device has a plurality of first closing members 64 which extend along the flow direction of the flue gas in the flue 13 and are provided at predetermined intervals in a width direction of the flue 13. The second closing device has a plurality of second closing members 65 which extend along the vertical direction and are provided at predetermined intervals in the width direction of the flue 13. Then, the plurality of first closing members 64 and the plurality of second closing members 65 are disposed to be shifted with respect to each other in the width direction of the flue 13.

The flue 13 (the second horizontal flue section 13c) is a flow path having a rectangular cross-sectional shape in which a width dimension in the horizontal direction is larger than a height dimension in the vertical direction, the bypass flow path 52 is a flow path having a rectangular cross-sectional shape in which a lateral width dimension in the horizontal direction which is orthogonal to the flow direction of the flue gas in the flue 13 is larger than a longitudinal width dimension in the horizontal direction along the flow of the flue gas in the flue 13, and the flue 13 and the bypass flow path 52 have the same width dimension. That is, the bypass flow path 52 is connected so as to be substantially orthogonal to the second horizontal flue section 13c from above. The connection angle of the bypass flow path 52 with respect to the second horizontal flue section 13c is not limited to 90 degrees and may be inclined to the downstream side or the upstream side of the flow of the flue gas in the flue 13.

The plurality of first closing members 64 extend along the longitudinal width direction of the downstream side connection portion 52b in the bypass flow path 52 and are disposed at predetermined intervals in the lateral width direction. In this case, each of the first closing members 64 has a plate shape, in which each end portion in a longitudinal direction is fixed to the inner wall surface of the bypass flow path 52 and a planar surface on the downstream side is continuous with the inner wall surface of the flue 13 without a step. Further, the plurality of second closing members 65 extend along the height direction of the immediately upstream portion of the downstream side connection portion 52b of the bypass flow path 52 in the flue 13 and are disposed at predetermined intervals in the width direction. In this case, each of the second closing members 65 has a plate shape, in which each end portion in the longitudinal direction is fixed to the inner wall surface of the flue and a planar surface on the downstream side is continuous with the inner wall surface of the bypass flow path 52 without a step.

Then, each of the first closing members 64 and each of the second closing members 65 are disposed to be shifted with respect to each other in the width direction of the flue 13 so as not to face the flow direction of the flue gas in the flue 13. That is, a configuration is made in which the flue gas flowing from the bypass flow path 52 to the mixing space section 63 through the gaps between the respective first closing members 64 and the flue gas flowing from the flue 13 to the mixing space section 63 through the gaps between the respective second closing members 65 do not directly collide with each other.

Here, each of the first closing members 64 is a closing plate extending along a direction orthogonal to the flow direction of the flue gas in the bypass flow path and is set to have the same width along the longitudinal width direction. Further, each of the second closing members 65 is a closing plate extending along a direction orthogonal to the flow direction of the flue gas in the flue 13 and is set to have the same width along the height direction.

Figure 5:
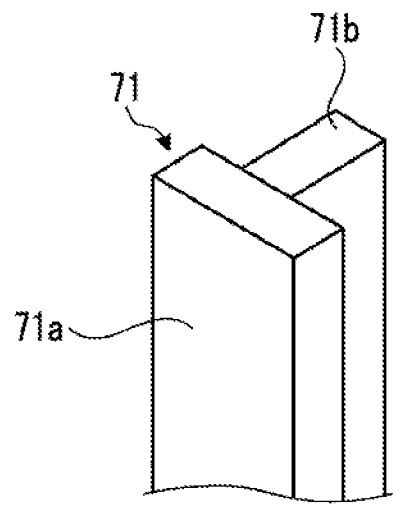
FIG. 5 is a perspective view showing Modification Example 1 of a second closing member.

In the description described above, the first closing members 64 and the second closing members 65 are set to be closing plates extending along the direction orthogonal to the flow direction of the flue gas. However, there is no limitation to this configuration. FIG. 5 is a perspective view showing Modification Example 1 of the second closing member, FIG. 6 is a plan view showing disposition of Modification Example 1 of the second closing member, FIG. 7 is a perspective view showing Modification Example 2 of the second closing member, and FIG. 8 is a plan view showing disposition of Modification Example 2 of the second closing member.

Figure 6:
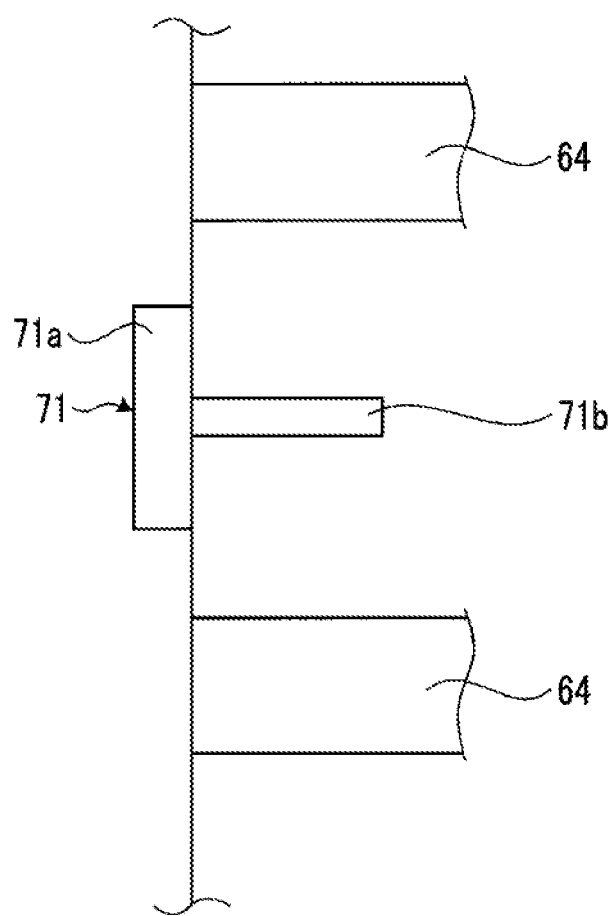
FIG. 6 is a plan view showing disposition of Modification Example 1 of the second closing member.

In Modification Example 1 of the second closing member, as shown in FIGS. 5 and 6, a second closing member 71 is configured of a closing plate 71a and a reinforcing plate 71b. The closing plate 71a is a plate member extending along the vertical direction and extending along a direction orthogonal to the flow direction of the flue gas, and the reinforcing plate 71b is a plate member extending along the vertical direction and extending in a direction parallel to the flow direction of the flue gas, and is fixed so as to extend from the closing plate 71a to the downstream side in the flow direction of the flue gas. In the second closing member 71, the closing plate 71a is located on the further upstream side with respect to the downstream side connection portion 52b of the bypass flow path 52, and the reinforcing plate 71b is located to extend toward the downstream side connection portion 52b side.

Figure 7:
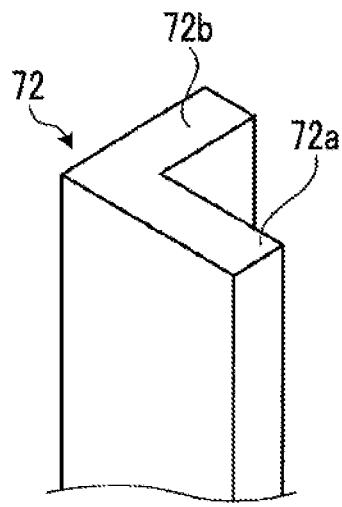
FIG. 7 is a perspective view showing Modification Example 2 of the second closing member.
Figure 8:
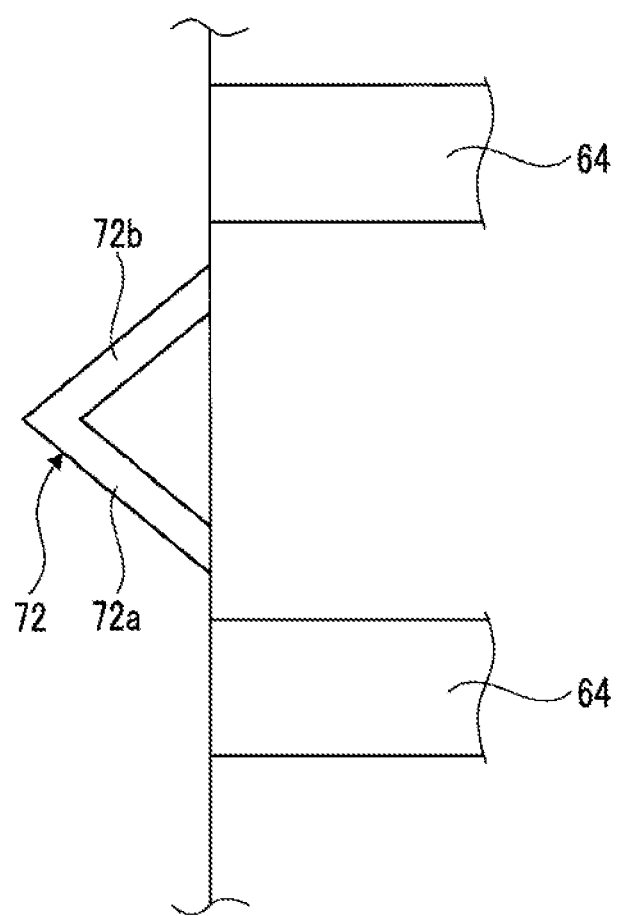
FIG. 8 is a plan view showing disposition of Modification Example 2 of the second closing member.

In Modification Example 2 of the second closing member, as shown in FIGS. 7 and 8, a second closing member is configured of closing plates 72a and 72b. The closing plates 72a and 72b are plate materials extending along the vertical direction and connected to each other so as to form a V-shaped cross-sectional shape, and are connected to each other so as to become wider toward the downstream side in the flow direction of the flue gas. The second closing member 72 is located on the further upstream side with respect to the downstream side connection portion 52b of the bypass flow path 52.

Here, the modification examples of the second closing member have been described. However, each of the second closing members 71 and 72 may be applied as the first closing member. Further, the first closing member and the second closing member are not limited to the configurations described above. For example, the first closing member and the second closing member may have an I-shaped cross-sectional shape, a column or rectangular column shape, or the like.

Here, the flow of the flue gas in the flue 13 of the coal-fired boiler 10 of this embodiment will be described.

As shown in FIGS. 1 to 3, during the high load operation of the coal-fired boiler 10, the flow rate adjustment damper 53 is fully opened, and on the other hand, the flow rate adjustment damper 54 is closed. Then, the high-temperature flue gas flowing through the flue 13 is heat-recovered while the total amount passes through the economizers 46 and 47, and then flows to the second horizontal flue section 13c. Then, since the flow path of the second horizontal flue section 13c is partially closed by the plurality of second closing members 65, the flue gas flowing through the second horizontal flue section 13c passes through the gaps between the respective second closing members 65, thereby being rectified due to a pressure loss, and goes round the respective second closing members 65, so that a vortex (a Karman vortex) occurs. For this reason, the flue gas flowing through the second horizontal flue section 13c is stirred when it passes through the gaps between the respective second closing members 65, and thus a flow velocity distribution in the height direction or the width direction is uniformized.

Thereafter, since the reducing agent supplying device 51 supplies the reducing agent to the flue gas with the flow velocity distribution in the height direction uniformized by the second closing device 62, variation in the concentration of the reducing agent in the second horizontal flue section 13c is reduced and the nitrogen oxides contained in the flue gas is efficiently reduced and removed by the selective reduction catalyst 50.

On the other hand, during the low load operation of the coal-fired boiler 10, the degree of opening of the flow rate adjustment damper 53 is adjusted so as to become small, and on the other hand, the degree of opening of the flow rate adjustment damper 54 is adjusted so as to become large.

Then, the high-temperature flue gas flowing through the flue 13 is heat-recovered by passing through the economizers 46 and 47 and becomes low-temperature flue gas, which then flows to the second horizontal flue section 13c. Further, some of the high-temperature flue gas flowing through the flue 13 flow into the bypass flow path 52, thereby bypasses the economizers 46 and 47, flows to the second horizontal flue section 13c while it has the high-temperature, and joins the low-temperature flue gas.

At this time, since each of the first closing members 64 and each of the second closing members 65 are shifted with respect to each other in the width direction of the flue 13, the high-temperature flue gas introduced from the bypass flow path 52 into the second horizontal flue section 13c passes through the gaps between the respective first closing members 64, whereby a pressure loss is added thereto, so that the flow velocity increases, and the high-temperature flue gas then flows to the downstream side of the respective second closing members 65 and reaches the mixing space section 63. Further, the low-temperature flue gas flowing through the second horizontal flue section 13c passes through the gaps between the respective second closing members 65, whereby a pressure loss is added thereto, so that the flow velocity increases, and the low-temperature flue gas then flows to the downstream side of the respective first closing members 64 and reaches the mixing space section 63. That is, the low-temperature flue gas which has passed through the gaps between the respective second closing members 65 does not inhibit the penetrating force of the high-temperature flue gas which has passed through the gaps between the respective first closing members 64, and in the mixing space section 63, the high-temperature part and the low-temperature part alternately cancel each other out in the width direction. Then, since the vortex (Karman vortex) is generated when the flue gas flowing through the second horizontal flue section 13c passes through the gaps between the respective second closing members 65, the high-temperature flue gas from the bypass flow path 52 and the low-temperature flue gas flowing through the second horizontal flue section 13c are efficiently stirred and mixed in the mixing space section 63, and the temperature distribution in the height direction is uniformized.

Thereafter, since the reducing agent supplying device 51 supplies the reducing agent to the flue gas with the temperature distribution in the height direction uniformized by the respective closing devices 61 and 62, variation in the concentration of the reducing agent in the second horizontal flue section 13c is reduced, and thus the nitrogen oxides contained in the flue gas is efficiently reduced and removed by the selective reduction catalyst 50. Further, the flue gas with the temperature uniformized due to mixing of the high-temperature flue gas from the bypass flow path 52 with the low-temperature flue gas flowing through the second horizontal flue section 13c is maintained at a temperature higher than or equal to the reaction temperature of the selective reduction catalyst 50, and thus blocking of the selective reduction catalyst 50 due to precipitation of acidic ammonium sulfate in the flue gas is suppressed.

In this manner, in the boiler of this embodiment, the reducing agent supplying device 51 and the selective reduction catalyst 50 are provided in the flue 13, the bypass flow path 52 bypassing the economizers 46 and 47 is provided in the flue 13, and the first closing device 61 partially closing the bypass flow path 52 and the second closing device 62 partially closing the flue 13 are provided. As the first closing device 61, the plurality of first closing members 64 extending along the flow direction of the flue gas in the flue 13 and provided at a predetermined interval in the width direction of the flue 13 are provided, and as the second closing device 62, the plurality of second closing members 65 extending along the vertical direction and provided at predetermined intervals in the width direction of the flue 13 are provided, and each of the first closing members 64 and each of the second closing members 65 are disposed so as to be shifted with respect to each other in the width direction of the flue 13.

Therefore, during the high load operation, the flue gas flowing through the flue 13 is rectified due to a pressure loss, and the flow velocity distribution is uniformized. On the other hand, during the low load operation, the penetrating force of the flue gas flowing from the bypass flow path 52 to the flue 13 is maintained due to an increase in the flow velocity by the first closing device 61, inhibition of the penetrating force by the second closing device 62 is suppressed, and the low-temperature flue gas and the high-temperature flue gas are efficiently mixed with each other due to the turbulent flow of the flue gas which has passed through the second closing device 62. As a result, it is possible to attain simplification of a structure and a reduction in cost and to properly mix the low-temperature flue gas and the high-temperature flue gas.

In the boiler of this embodiment, the second horizontal flue section 13c having a straight line shape is provided in the flue 13, and the second closing device 62 and the reducing agent supplying device 51 are disposed in the second horizontal flue section 13c. Therefore, the reducing agent is supplied to the flue gas rectified by the second closing device 62 to have the uniformized flow velocity distribution, or the flue gas rectified by the respective closing devices 61 and 62 to have the uniformized temperature distribution, whereby the reducing agent is uniformly supplied with variation of the reducing agent with respect to the flue gas being reduced, and thus the efficiency of removing the nitrogen oxides by the selective reduction catalyst 50 can be improved.

In the boiler of this embodiment, the flow rate adjustment damper 53 is disposed on the further upstream side with respect to the second closing device 62 in the second horizontal flue section 13c. Therefore, the second closing device 62 is disposed between the flow rate adjustment damper 53 and the downstream side connection portion 52b of the bypass flow path 52, whereby the flue gas having the uniformized flow velocity distribution or temperature distribution is caused to flow to the reducing agent supplying device 51 in that state, and thus the efficiency of removing the nitrogen oxides by the selective reduction catalyst 50 can be improved.

In the boiler of this embodiment, the mixing space section 63 is provided at a position facing the downstream side connection portion 52b on the further downstream side with respect to the first closing device 61 in the flue 13. Therefore, the mixing space section 63 is provided on the downstream side of the first closing device 61 and the second closing device 62, whereby the high-temperature flue gas flowing from the bypass flow path 52 to the flue through the first closing device 61 and the low-temperature flue gas which has passed through the second closing device 62 are efficiently mixed with each other in the mixing space section 63, and thus the temperature distribution of the flue gas can be easily uniformized with a simple configuration.

In the boiler of this embodiment, the first closing device 61 and the second closing device 62 are disposed to face the mixing space section 63. Therefore, the high-temperature flue gas and the low-temperature flue gas are mixed with each other in the mixing space section 63 in a state where the flow velocity is increased, and thus the temperature distribution of the flue gas can be easily uniformized.

In the boiler of this embodiment, the second closing member 71 is the closing plate 71a extending along a direction orthogonal to the flow direction of the flue gas in the flue 13, and is set to have the same width along the vertical direction. Therefore, the flue gas collides with the closing plate 71a, whereby a vortex is generated when the flue gas goes round the end portion of the closing plate 71a, and therefore, the high-temperature flue gas and the low-temperature flue gas can be efficiently mixed with each other due to the generated vortex.

In the boiler of this embodiment, the reinforcing plate 71b extending toward the downstream side in the flow direction of the flue gas is fixed to the closing plate 71a. Therefore, the closing plate 71a is reinforced by the reinforcing plate 71b, so that rigidity thereof is improved, and therefore, durability can be improved.

In the embodiment described above, the boiler according to the present invention has been described as being a coal-fired boiler. However, it may be a boiler using biomass, petroleum coke, petroleum residue, or the like as the solid fuel. Further, the fuel is not limited to the solid fuel, and heavy oil or the like can also be used for an oil-fired boiler, and furthermore, gas (by-product gas) can also be used as the fuel. Further, the boiler according to the present invention can also be applied to mixed fuel combustion of these fuels.

REFERENCE SIGNS LIST

10: coal-fired boiler (boiler)
11: furnace
12: combustion device
13: flue
21, 22, 23, 24, 25: combustion burner
41, 42, 43: superheater (heat exchanger)
44, 45: reheater (heat exchanger)
46, 47: economizer (heat exchanger)
50: selective reduction catalyst (denitration catalyst)
51: reducing agent supplying device
52: bypass flow path
53, 54: flow rate adjustment damper
61: first closing device
62: second closing device
63: mixing space section
64: first closing member
65, 71, 72: second closing member

The invention claimed is:

1. A boiler comprising:
a furnace having a hollow shape and installed along a vertical direction;
a combustion device disposed in the furnace;
a flue connected to an upper portion of the furnace in the vertical direction to cause flue gas to flow therethrough;
a heat exchanger disposed in the flue;
a reducing agent supplying device disposed on the further downstream side in a flow direction of the flue gas with respect to the heat exchanger in the flue;
a denitration catalyst disposed on the further downstream side in the flow direction of the flue gas with respect to the reducing agent supplying device in the flue;
a bypass flow path having one end portion connected to the further upstream side in the flow direction of the flue gas with respect to the heat exchanger in the flue, and the other end portion connected between the heat exchanger and the reducing agent supplying device in the flue;
a first closing device which is provided on the further upstream side in the flow direction of the flue gas with respect to a downstream side connection portion with the flue, to which the other end portion of the bypass flow path is connected, and partially closes the bypass flow path; and
a second closing device which is provided on the further upstream side with respect to the downstream side connection portion in the flue and partially closes the flue,
wherein the first closing device has a plurality of first closing members extending along the flow direction of the flue gas in the flue and provided at predetermined intervals in a width direction of the flue,
the second closing device has a plurality of second closing members extending along a vertical direction and provided at predetermined intervals in the width direction of the flue,
a mixing space section is provided adjacent to the plurality of first closing members and the plurality of second closing members and at a position facing the downstream side connection portion on the further downstream side with respect to the first closing device in the flue,
the plurality of first closing members and the plurality of second closing members are disposed to be shifted with respect to each other in the width direction of the flue, and the flue gas flowing from the bypass flow path to the mixing space section through gaps between the respective first closing members and the flue gas flowing from the flue to the mixing space section through gaps between the respective second closing members do not directly collide with each other.

2. The boiler according to claim 1, wherein the flue is provided with a straight flue section, and the second closing device and the reducing agent supplying device are disposed in the straight flue section.

3. The boiler according to claim 2, wherein a flow rate adjustment damper is disposed on the further upstream side with respect to the second closing device in the straight flue section.

4. The boiler according to claim 1, wherein a mixing space section is provided at a position facing the downstream side connection portion on the further downstream side with respect to the first closing device in the flue.

5. The boiler according to claim 4, wherein the first closing device and the second closing device are disposed to face the mixing space section.

6. The boiler according to claim 1, wherein the second closing member is a closing plate extending along a direction orthogonal to the flow direction of the flue gas in the flue and is set to have the same width along the vertical direction.

7. The boiler according to claim 6, wherein a reinforcing plate extending to the downstream side in the flow direction of the flue gas is fixed to the closing plate.

* * * * *